(12) United States Patent
Smith

(10) Patent No.: US 11,986,113 B2
(45) Date of Patent: May 21, 2024

(54) MULTI-HEIGHT DECK MAT

(71) Applicant: Katrina Smith, Morehead City, NC (US)

(72) Inventor: Katrina Smith, Morehead City, NC (US)

( * ) Notice: Subject to any disclaimer, the term of this patent is extended or adjusted under 35 U.S.C. 154(b) by 0 days.

(21) Appl. No.: 17/571,596

(22) Filed: Jan. 10, 2022

(65) Prior Publication Data

US 2023/0218099 A1 Jul. 13, 2023

(51) Int. Cl.
*A47G 27/02* (2006.01)
*A47G 27/00* (2006.01)
*A47C 27/00* (2006.01)

(52) U.S. Cl.
CPC ..... *A47G 27/0212* (2013.01); *A47G 27/0218* (2013.01); *A47C 27/001* (2013.01); *A47G 27/0231* (2013.01)

(58) Field of Classification Search
CPC ............ A47G 27/0212; A47G 27/0218; A47G 27/0231; A47G 27/0237; A47G 9/062; A47G 9/06; A47C 27/001
USPC ..................... 5/420, 417, 722, 723
See application file for complete search history.

(56) References Cited

U.S. PATENT DOCUMENTS

| | | | | |
|---|---|---|---|---|
| 681,573 A * | 8/1901 | Nichols | ............... | A47C 27/001 5/722 |
| 836,326 A * | 11/1906 | Kinyon | ............... | A47C 27/001 5/722 |
| 1,132,869 A * | 3/1915 | Nichols | ............... | A47C 27/001 5/722 |
| 1,153,120 A * | 9/1915 | Lackey | ............... | A47C 27/001 5/722 |
| 1,423,954 A * | 7/1922 | Maussner | ............ | A47C 27/001 5/699 |
| 1,804,027 A * | 5/1931 | O'Toole | ............ | A47G 27/0218 15/239 |
| 1,805,038 A * | 5/1931 | Derr | .................. | A47G 27/0231 428/493 |
| D142,685 S * | 10/1945 | Zinkel | ............................ | 5/722 |
| 2,589,579 A * | 3/1952 | Slayen | ................ | A47C 27/001 5/722 |
| 2,853,399 A * | 9/1958 | Shoults | .................. | B32B 27/00 428/440 |

(Continued)

FOREIGN PATENT DOCUMENTS

GB 2010178 A * 6/1979 ............... A63B 6/00

*Primary Examiner* — Robert G Santos
(74) *Attorney, Agent, or Firm* — Mark Taylor

(57) ABSTRACT

A multi-height deck mat including a first platform having a first top surface, a first bottom surface and a first end surface extending therebetween; a second platform disposed adjacent the first platform and having a second top surface and a second bottom surface and a second end surface extending therebetween; and a hinge connecting the first platform and the second platform for movement of the first and second platforms relative to one another, the hinge element being adjacent the first end surface and the second end surface, whereby the first platform and the second platform can be moved between a first disposition wherein the first end surface is in abutment with the second end surface wherein the deck mat provides a first height; and a second disposition wherein the first platform and the second platform assume a stacked relationship wherein the deck mat provides a second height.

14 Claims, 8 Drawing Sheets

(56) References Cited

U.S. PATENT DOCUMENTS

| | | | |
|---|---|---|---|
| 3,047,888 A * | 8/1962 | Shecter | A47C 27/15 428/218 |
| 3,125,768 A * | 3/1964 | Rickert | A47C 23/00 5/240 |
| 3,253,293 A | 5/1964 | George et al. | |
| 3,390,414 A | 7/1965 | Kravitt | |
| 3,284,819 A * | 11/1966 | Nissen | A63C 19/04 404/35 |
| 3,319,273 A * | 5/1967 | Solin | A63B 6/00 473/29 |
| 3,360,806 A * | 1/1968 | Dunaway | B60R 13/01 5/118 |
| 3,555,581 A * | 1/1971 | Friant | A47C 3/16 5/722 |
| 3,650,872 A * | 3/1972 | McKiernan | B29C 66/1142 156/304.6 |
| 3,742,526 A * | 7/1973 | Lillard | A47C 17/045 5/28 |
| 4,275,473 A * | 6/1981 | Poirier | A47C 15/006 5/699 |
| 4,868,940 A * | 9/1989 | Masadi | A47C 27/001 428/167 |
| 4,985,952 A * | 1/1991 | Edelson | A47C 27/001 5/12.2 |
| 5,022,111 A * | 6/1991 | Fenner, Sr. | A47C 27/144 5/736 |
| 5,066,001 A * | 11/1991 | Wilkinson | A63B 21/4037 482/52 |
| 5,173,346 A * | 12/1992 | Middleton | B32B 5/18 4/581 |
| 5,173,348 A | 12/1992 | Middleton | |
| 5,491,851 A * | 2/1996 | Alonso | A47C 27/001 5/722 |
| 5,669,089 A * | 9/1997 | Dees | B25H 5/00 5/722 |
| 5,950,260 A * | 9/1999 | Dees | B25H 5/00 5/419 |
| 5,987,676 A * | 11/1999 | Littleford | A47G 9/10 5/636 |
| 6,088,857 A * | 7/2000 | Ogle | A47C 27/002 5/722 |
| 6,200,661 B1 | 3/2001 | Daniels et al. | |
| 6,272,704 B1 * | 8/2001 | Cutler | A47D 5/006 5/721 |
| 6,618,883 B2 * | 9/2003 | Angland | A47C 17/04 5/659 |
| 6,711,766 B2 * | 3/2004 | Monk | E04C 2/405 5/722 |
| 6,951,035 B2 * | 10/2005 | Kinchen | A47G 33/00 5/655.9 |
| 7,036,162 B1 * | 5/2006 | Gatten | A47C 27/085 5/655.5 |
| 7,192,631 B2 * | 3/2007 | Polley | B32B 3/00 428/68 |
| 7,445,833 B2 * | 11/2008 | Polley | B32B 3/00 428/72 |
| 7,682,680 B2 * | 3/2010 | McMahan | B32B 7/022 428/102 |
| 7,754,127 B2 * | 7/2010 | McMahan | B29C 66/112 264/261 |
| 8,034,274 B1 * | 10/2011 | McMahan | B29C 65/04 264/261 |
| 9,675,151 B1 | 6/2017 | MacNeil et al. | |
| 9,833,970 B2 | 12/2017 | Brewer | |
| 9,854,930 B1 * | 1/2018 | MacNeil | A45C 7/00 |
| 10,383,470 B2 * | 8/2019 | Weih | H04L 63/10 |
| 10,905,271 B1 * | 2/2021 | Popova | B29C 43/18 |
| 11,401,730 B2 * | 8/2022 | Brensinger | A47B 3/06 |
| 2003/0068463 A1 * | 4/2003 | Polley | A47G 27/0231 428/71 |
| 2003/0097713 A1 * | 5/2003 | Kinchen | A47G 27/0237 5/652 |
| 2003/0140423 A1 * | 7/2003 | Angland | A47C 17/04 5/659 |
| 2003/0221256 A1 * | 12/2003 | Monk | F41H 5/08 5/722 |
| 2004/0012117 A1 | 6/2004 | Peterson | |
| 2006/0172122 A1 * | 8/2006 | Polley | B32B 3/00 428/72 |
| 2008/0078028 A1 * | 4/2008 | McMahan | B29C 65/04 5/655.5 |
| 2008/0113170 A1 * | 5/2008 | McMahan | B32B 37/15 264/299 |
| 2008/0118671 A1 * | 5/2008 | Bienkiewicz | A63B 21/4037 428/12 |
| 2012/0024454 A1 * | 2/2012 | McMahan | A47G 27/0231 156/60 |
| 2014/0154474 A1 | 6/2014 | Robbins, III | |
| 2018/0368604 A1 * | 12/2018 | Weih | A47G 27/0231 |
| 2020/0305593 A1 * | 10/2020 | Brensinger | A47B 3/083 |
| 2023/0218099 A1 * | 7/2023 | Smith | A47G 27/0231 5/420 |

\* cited by examiner

MULTI-HEIGHT DECK MAT

CROSS-REFERENCE TO RELATED APPLICATION

The present application claims the benefit of U.S. Provisional Patent Application No. 63/135,385, filed Jan. 11, 2021, which is incorporated by reference herein in its entirety.

BACKGROUND OF THE INVENTION

The present invention relates broadly to boat accessories and more specifically to a multi-height deck mat for use by a boat operator.

Certain boat configurations require an operator to stand at the helm to control operation of the boat. One such configuration is known as a center console boat, which is a type of single-decked, open hull boat, where an upstanding control structure is disposed at about the center of the boat and referred to as the console. The console contains the helm where all the controls are located, including steering, ignition, radio, and other electronic devices. Such a configuration provides the standing operator with the ability to move about the boat from cutwater to wake in an efficient matter. Center console boats typically range in length from eighteen (18) to forty (40) feet and are useful as, among other things, fishing boats.

One of the drawbacks to the center console configuration is that the operator may become fatigued more rapidly when standing, rather than sitting, to control a relatively small craft. Such a small boat may be moving about under the operator, who must put forth some effort to maintain control and balance, a condition known as "having one's sea legs". Nevertheless, fatigue may ensue and a cushioned deck mat for the operator to stand on should provide some relief, and enhance the ability of the operator to safely operate the boat.

One such deck mat is provided in Peterson, United States Patent Application Publication No. US2004/0121117 (Peterson '117), now abandoned. There, a detachable cushioned-carpet section is provided for marine use on a boat in the helm area where a helmsman stands. The carpet section has a pad adhered to its underside to add foot comfort and snaps in place using snap elements mounted to the deck surface and the carpet section (see Abstract).

There is another problem that is not addressed by the Peterson '117 mat. The helm controls on a console boat are at a fixed height and, in some cases, one size does not fit all. Operators of shorter stature may be placed in an uncomfortable position while trying to operate a console boat, stand upright at the helm, and ward off fatigue. Such a operating position may cause problems, ranging from mild discomfort for the helmsman to genuinely unsafe boat operation. Accordingly, there exists a need for an apparatus or device that will accommodate a wider range of users of different heights, thereby allowing boat operation in a more comfortable, and safer manner.

SUMMARY OF THE INVENTION

It is accordingly an object of the present invention to provide a multi-height deck mat for boating use that can accommodate boat operators of different heights.

It is another object of the present invention to provide such a mat that may be moved between two configurations, with each configuration providing a predetermined amount of elevation to a boat operator.

It is another object of the present invention to provide such a multi-height deck mat that is movable between two configurations, thereby providing a first height and a second height to accommodate differently sized boat operators.

To those collective ends, and according to one preferred embodiment thereof, the present invention is directed to a multi-height deck mat for supporting a boat operator in a marine environment, the multi-height deck mat including a first platform having a generally horizontally-oriented first top surface, a generally horizontally-oriented first bottom surface and at least one generally vertically-oriented first end surface extending therebetween. A second platform is disposed adjacent the first platform and has a generally horizontally-oriented second top surface and a generally horizontally-oriented second bottom surface and at least one generally vertically-oriented second end surface extending therebetween. A hinge element connects the first platform and the second platform for movement of the first and second platforms relative to one another, the hinge element being disposed adjacent the at least one generally vertically-oriented first end surface and the at least one generally vertically-oriented second end surface. The first platform and the second platform is movable between a first disposition wherein the at least one generally vertically-oriented first end surface is in abutment with the at least one generally vertically-oriented second end surface wherein the deck mat provides a first height; and a second disposition wherein the first platform and the second platform assume a stacked relationship wherein the deck mat provides a second height, greater than the first height.

According to one preferred embodiment of the present invention, the hinge element connects the first platform and the second platform at the first bottom surface and the second bottom surface, whereby the second platform is movable between a first disposition wherein the at least one generally vertically-oriented first end surface is adjacent the at least one generally vertically-oriented second end surface wherein the deck mat provides a first height; and a second disposition wherein the second platform is disposed under the first platform in a stacked relationship with the first bottom surface in abutment with the second bottom surface, wherein the deck mat provides a second height.

According to another preferred embodiment, the hinge element connecting the first platform and the second platform for movement of the first and second platforms relative to one another, the hinge element being disposed adjacent the at least one generally vertically-oriented first end surface and the at least one generally vertically-oriented second end surface, the hinge connecting the first platform and the second platform at the first top surface and the second top surface, whereby the second platform is movable between a first disposition wherein the at least one generally vertically-oriented first end surface is in abutment with the at least one generally vertically-oriented second end surface wherein the deck mat provides a first height; and a second disposition wherein the first platform is disposed under the second platform in a stacked relationship with the first top surface in abutment with the second top surface wherein the deck mat provides a second height.

Preferably, the first platform includes a first layer including the first top surface, a second layer including the first bottom surface and a third layer extending therebetween, wherein the third layer is formed from a cushion material. It is further preferred that the second platform includes a first layer including the second top surface, a second layer including the second bottom surface and a third layer extending therebetween, wherein the third layer is formed from a cushion material.

Preferentially, the first platform includes a first layer including the first top surface, a second layer including the first bottom surface and a third layer extending therebetween, wherein the third layer is formed from a cushion material.

It is preferred that the wherein hinge element is formed as a sheet extending between the first platform and the second platform, with a first sheet portion mounted to the first platform intermediate the top layer and the cushioned layer and a second sheet portion mounted to the second platform intermediate the top layer and the cushioned layer. Preferably, a portion of the hinge element extending between the first platform and the second platform is formed from an pliant material.

It is further preferred that the first top surface and the second top surface are formed from a polymer defining a textured surface for enhanced traction. Preferably, the first bottom surface and the second bottom surface are formed from a polymer defining a textured surface for enhanced traction.

Preferentially, the surface area of the first and second top surfaces is greater than the surface area of the first and second bottom surfaces, thereby forming a beveled wall intermediate the first and second top surfaces and the first and second bottom surfaces.

According to another preferred embodiment thereof, a multi-height deck mat for supporting a boat operator in a marine environment, the multi-height deck mat includes a first platform having a generally horizontally-oriented first top surface, a generally horizontally-oriented first bottom surface and at least one generally vertically-oriented first end surface extending therebetween. A second platform is disposed adjacent the first platform and has a generally horizontally-oriented second top surface and a generally horizontally-oriented second bottom surface and at least one generally vertically-oriented second end surface extending therebetween. A hinge element connects the first platform and the second platform for movement of the first and second platforms relative to one another, the hinge element being disposed adjacent the at least one generally vertically-oriented first end surface and the at least one generally vertically-oriented second end surface, the hinge connecting the first platform and the second platform at the first bottom surface and the second bottom surface, whereby the second platform is movable between a first disposition wherein the at least one generally vertically-oriented first end surface is in abutment with the at least one generally vertically-oriented second end surface wherein the deck mat provides a first height; and a second disposition wherein the second platform is disposed under the first platform in a stacked relationship with the first bottom surface in abutment with the second bottom surface, wherein the deck mat provides a second height.

Preferably, the first platform includes a first layer including the first top surface, a second layer including the first bottom surface and a third layer extending therebetween, wherein the third layer is formed from a cushion material. In addition, the second platform may include a first layer including the second top surface, a second layer including the second bottom surface and a third layer extending therebetween, wherein the third layer is formed from a cushion material.

It is further preferred that the first platform includes a first layer including the first top surface, a second layer including the first bottom surface and a third layer extending therebetween, wherein the third layer is formed from a cushion material.

It is preferred that the first top surface and the second top surface are formed from a polymer defining a textured surface for enhanced traction. In addition, it is preferable that the first bottom surface and the second bottom surface are formed from a polymer defining a textured surface for enhanced traction.

Preferably, the surface area of the first and second top surfaces is greater than the surface area of the first and second bottom surfaces, thereby forming a beveled wall intermediate the first and second top surfaces and the first and second bottom surfaces.

According to another preferred embodiment, a multi-height deck mat for supporting a boat operator in a marine environment, the multi-height deck mat includes a first platform having a generally horizontally-oriented first top surface, a generally horizontally-oriented first bottom surface and at least one generally vertically-oriented first end surface extending therebetween. A second platform is disposed adjacent the first platform and has a generally horizontally-oriented second top surface and a generally horizontally-oriented second bottom surface and at least one generally vertically-oriented second end surface extending therebetween. A hinge element connects the first platform and the second platform for movement of the first and second platforms relative to one another, with the hinge element being disposed adjacent the at least one generally vertically-oriented first end surface and the at least one generally vertically-oriented second end surface, the hinge connecting the first platform and the second platform at the first top surface and the second top surface. Accordingly, the second platform is movable between a first disposition wherein the at least one generally vertically-oriented first end surface is in abutment with the at least one generally vertically-oriented second end surface wherein the deck mat provides a first height; and a second disposition wherein the first platform is disposed under the second platform in a stacked relationship with the first top surface in abutment with the second top surface wherein the deck mat provides a second height.

Preferably, the first platform includes a first layer including the first top surface, a second layer including the first bottom surface and a third layer extending therebetween, wherein the third layer is formed from a cushion material. It is further preferred that the second platform includes a first layer including the second top surface, a second layer including the second bottom surface and a third layer extending therebetween, wherein the third layer is formed from a cushion material.

By the above, the present invention provides a multi-height deck mat for boating use that is moveable between a first condition providing support at a first height, and a second condition providing support at a second height, thereby accommodating boat operators of different heights in a more comfortable manner.

DESCRIPTION OF THE PREFERRED EMBODIMENT

Figure 1:
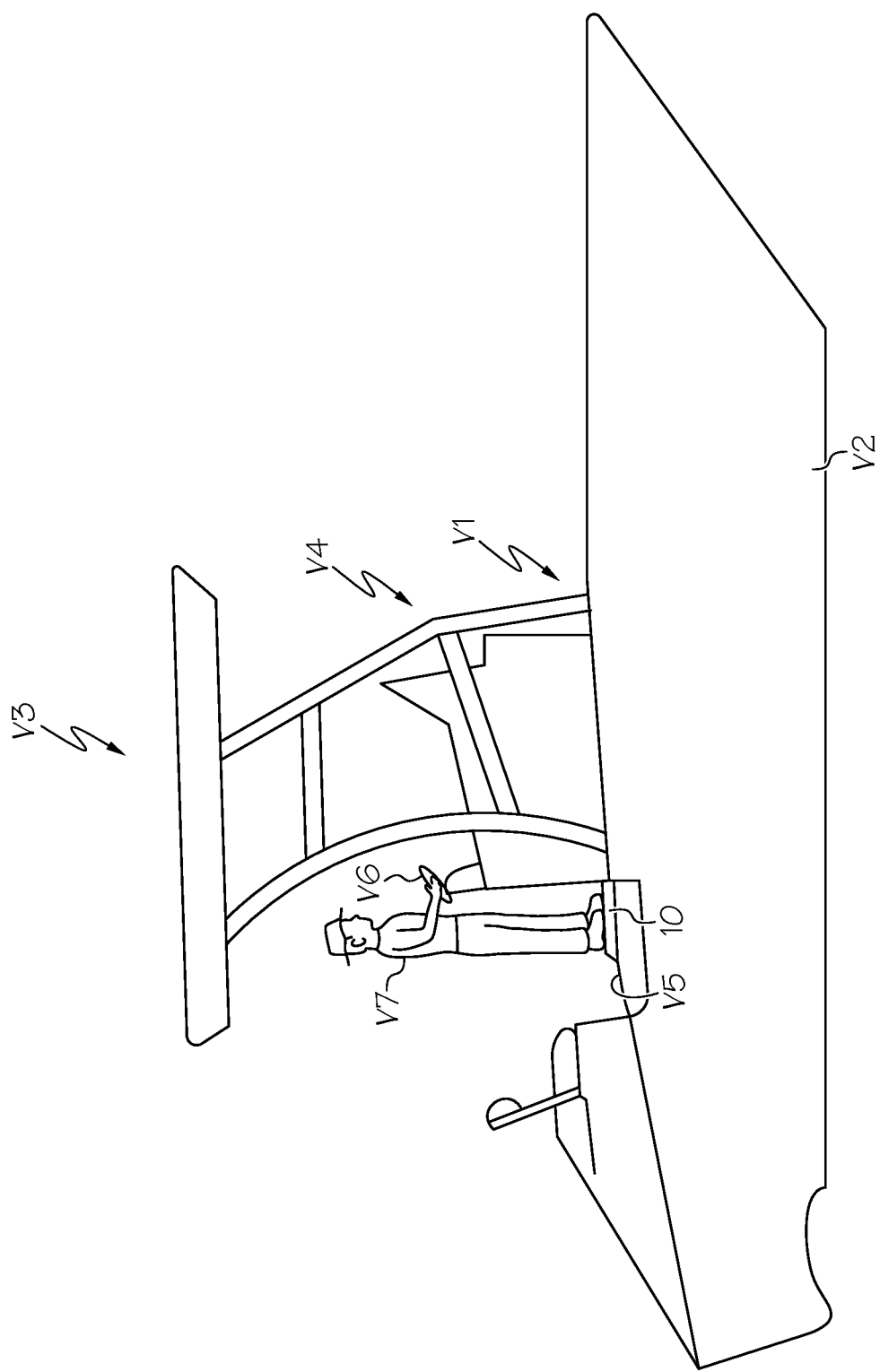
FIG. 1 is a side view of a console boat, broken open to illustrate the present invention in use in a first configuration, according to one preferred embodiment thereof.

Turning now to the drawings and more particularly to FIG. 1, a multi-height deck mat is illustrated generally at 10 in its operating environment. There, a console boat V1 includes a hull V2 having a center console V3 mounted thereto. The center console V3 includes a helm V4, which includes a boat wheel V6. A first boat operator V7 having a first height is illustrated standing at the helm V4 on the present mat 10 in an open condition providing cushioned support at a first height.

Figure 2:
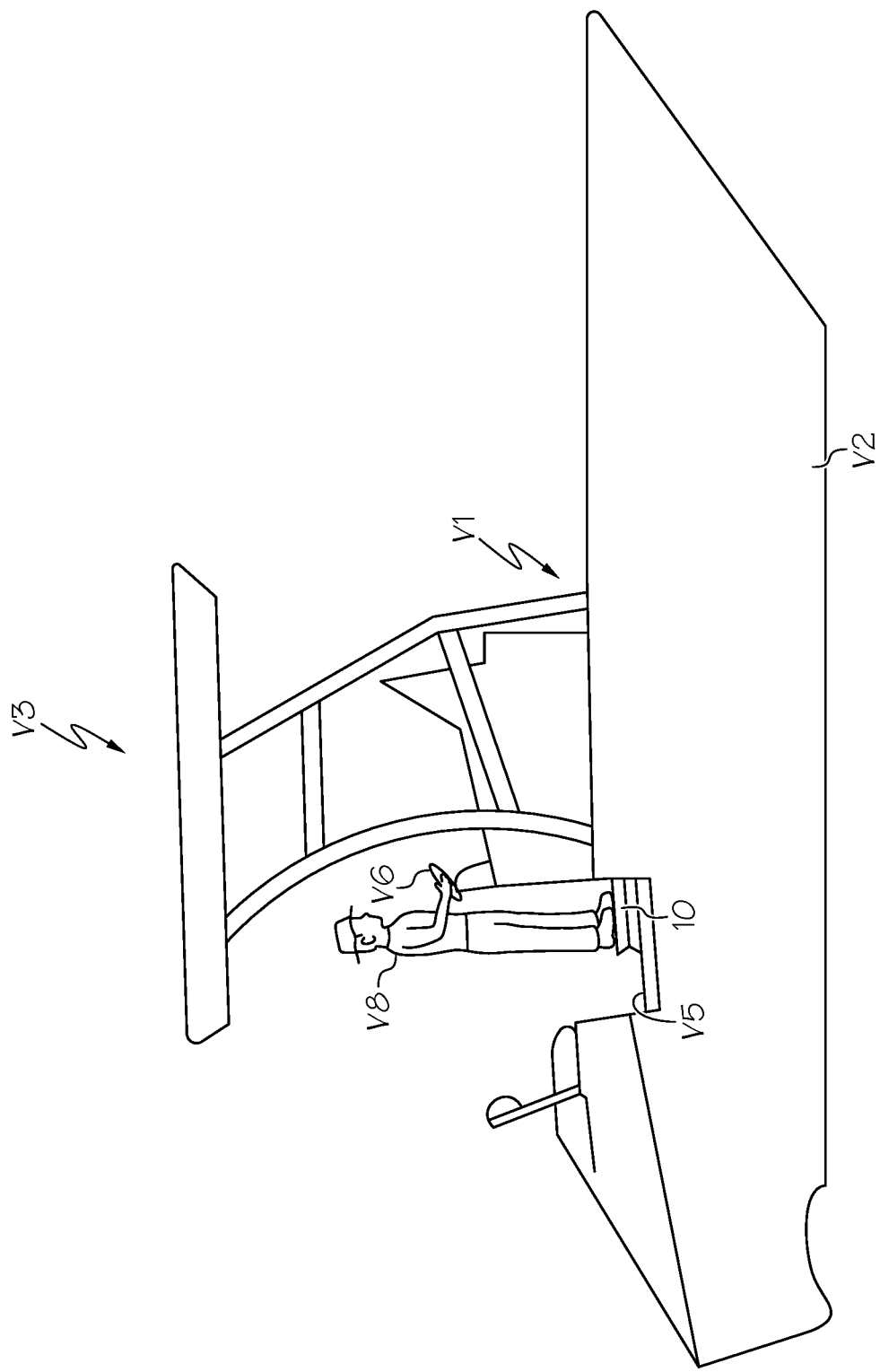
FIG. 2 is a side view of a console boat, broken open to illustrate the present invention in use in a second configuration, according to one preferred embodiment thereof.

With reference to FIG. 2, a second boat operator V8 having a second, shorter height is standing at the helm V4 of the same console boat V1. The second boat operator V8 is standing on the mat 10 of the present invention folded into a second configuration, providing a second height to the multi-height mat 10 and thereby raising the second boat operator V8 into a safer and more comfortable operating position than would be available with the mat 10 in the first, unfolded configuration.

Figure 3:
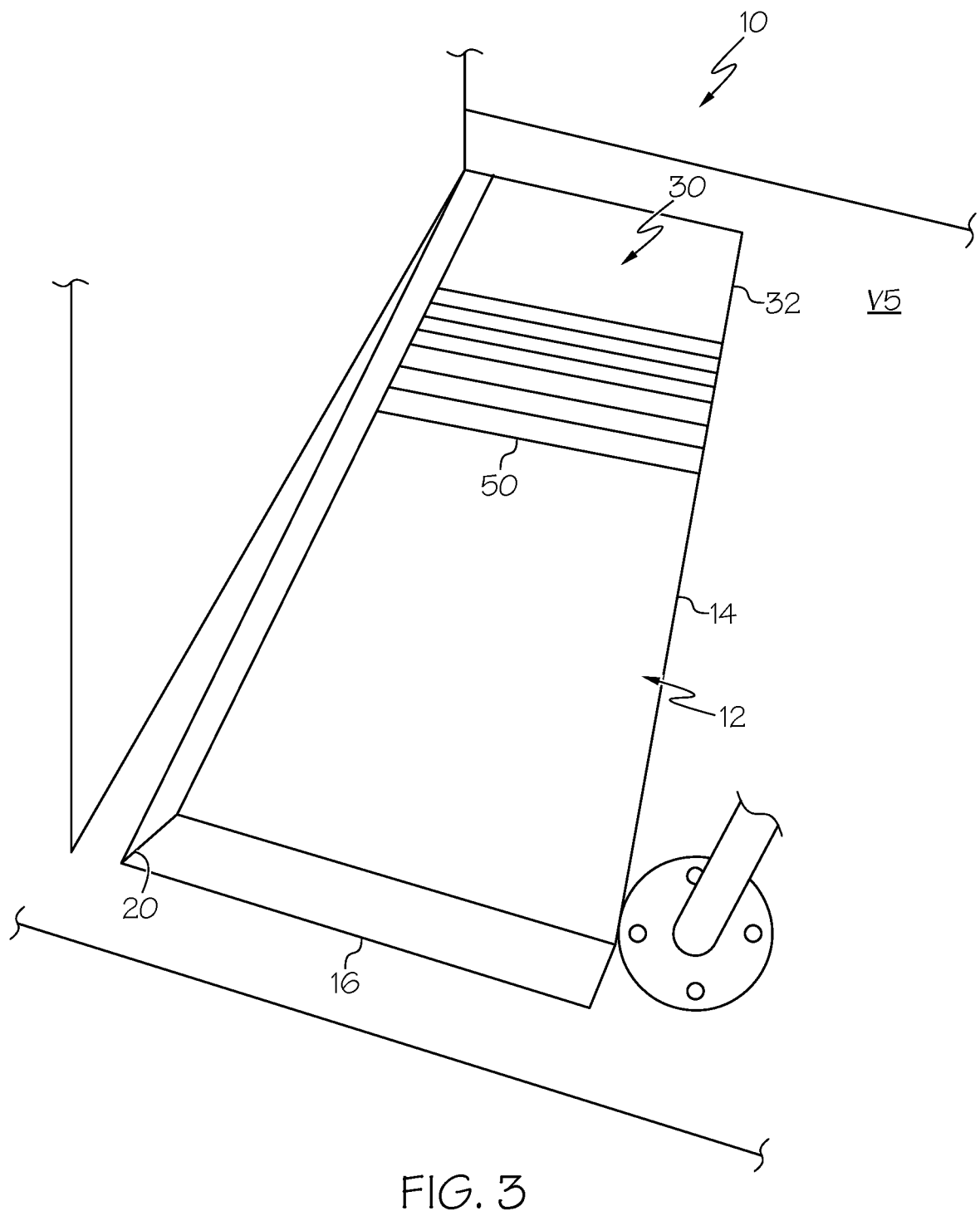
FIG. 3 is a perspective view of a multi-height deck mat according to one preferred embodiment thereof.

As seen in FIG. 3, the multi-height deck mat 10 is illustrated at a first height, in an open position, positioned on a boat deck V5. The mat 10 is generally rectangular and should be at least fourteen (14) inches wide, and about thirty-six (36) inches long. The mat 10 includes a first platform 12 and a second platform 30 attached to one another with a hinge element 50, with each platform being about eighteen (18) inches long. The first platform 12 includes at least one flat end wall 22 for abutment with a similar flat end wall 42 formed on the second platform 30 when the mat 10 is at an unfolded configuration. It should be noted that while the first platform 12 can abut the second platform 30 in use, there may be conditions wherein the first platform 12 is closely adjacent the second platform 30 in an unfolded condition during use.

As best seen in FIGS. 3, 5, 6 and 7, the top layers 14, 32 and bottom layers 16, 34 of the present mat 10 are configured for use in a marine environment, wherein the surfaces have been configured for enhanced traction. The top layers 14, 32 and the bottom layers 16, 34 may be formed from a polymer material and are formed with an uneven surface for enhanced traction when in contact with a deck or with the shoes of a boat operator V7, V8, as seen in FIG. 1. Further, the surfaces of the top layers 14, 32 and the bottom layers 16, 34 help maintain traction when in contact with one another to resist shear forces acting on the mat when in a folded disposition during use by a boat operator V8, as also seen in FIG. 1.

Figure 4:
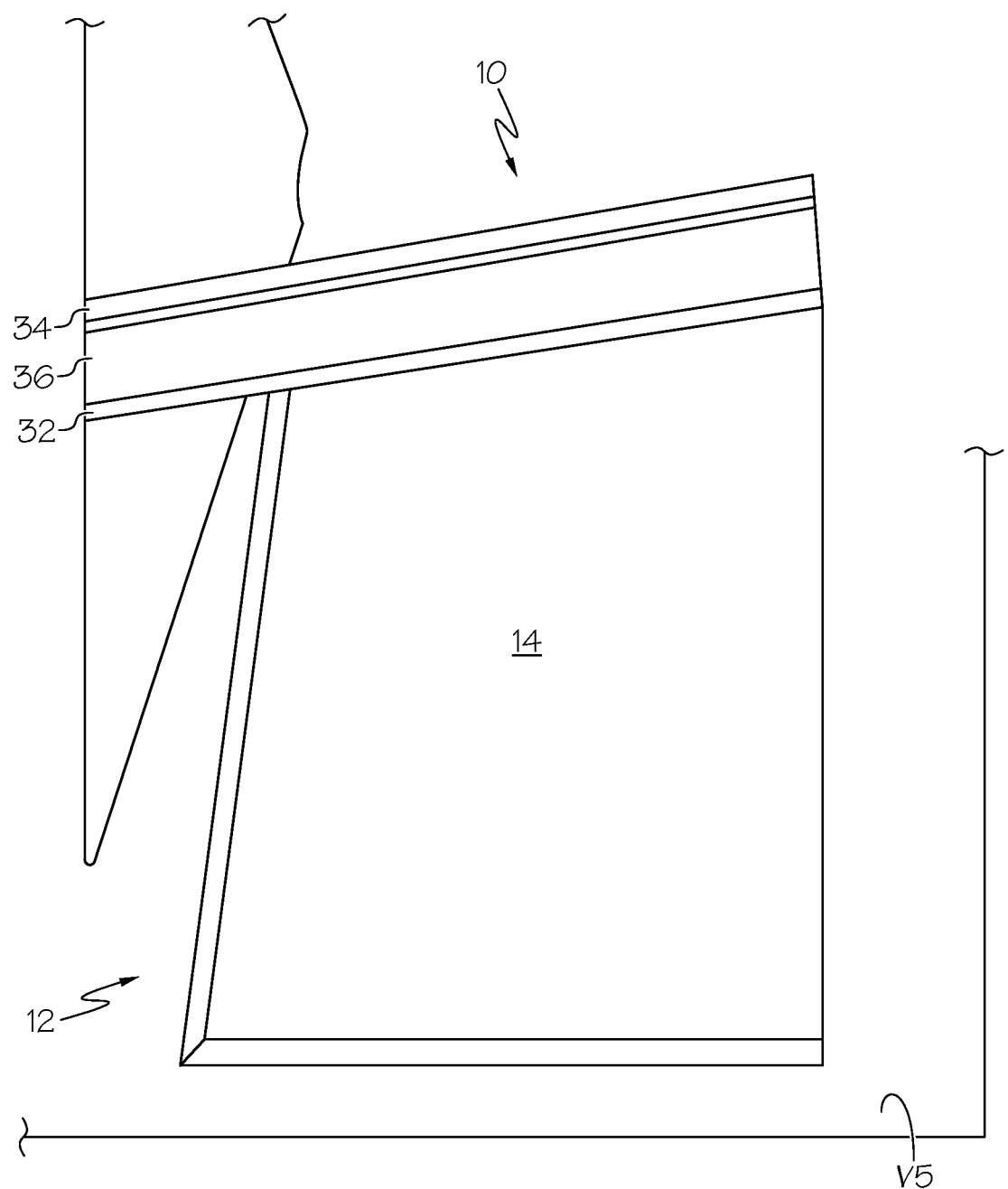
FIG. 4 is a perspective view of the multi-height deck mat illustrated in FIG. 3 being folded to a second configuration.
Figure 5:
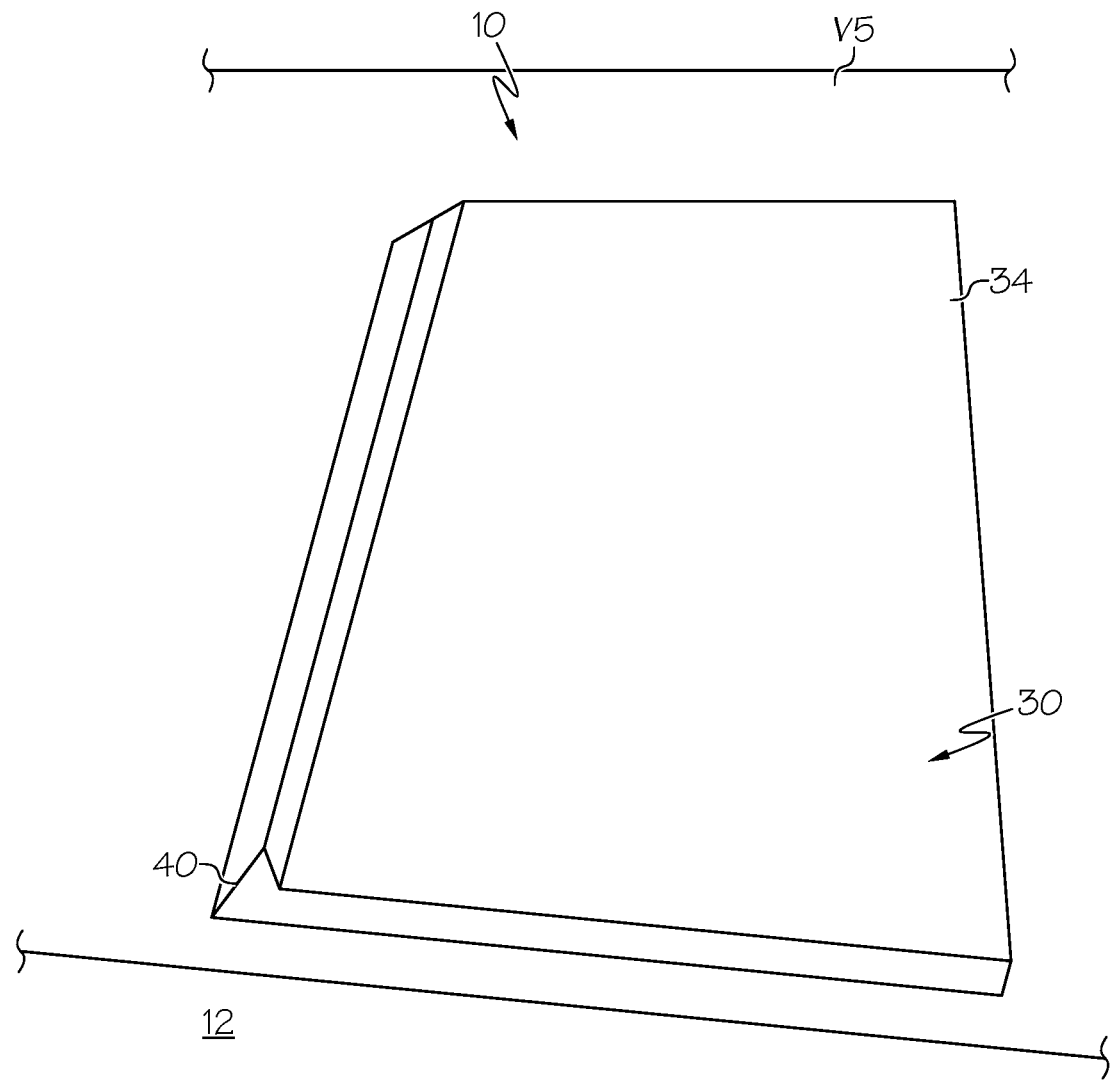
FIG. 5 is a perspective view of the multi-height deck mat illustrated in FIG. 3 having been folded to a second configuration.

As seen in FIG. 4, each platform 12, 30 is formed as a three-layered structure including, with reference to the second platform 30, an upper rigid or semi-rigid layer 32, a cushioned intermediate layer 36 and a lower rigid, or semi-rigid layer 34. The first platform 12 is constructed in the same manner. The platforms are joined by a pliant hinge element 50.

Figure 6:
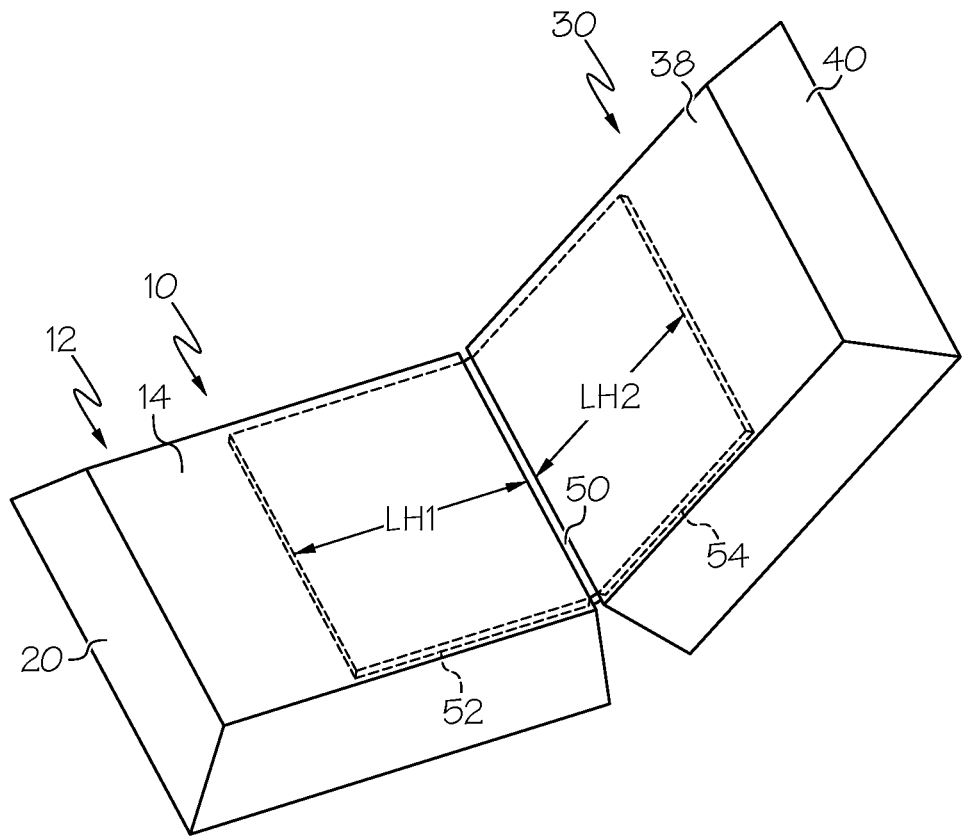
FIG. 6 is a perspective view of the multi-height deck mat illustrated in FIG. 3.
Figure 7:
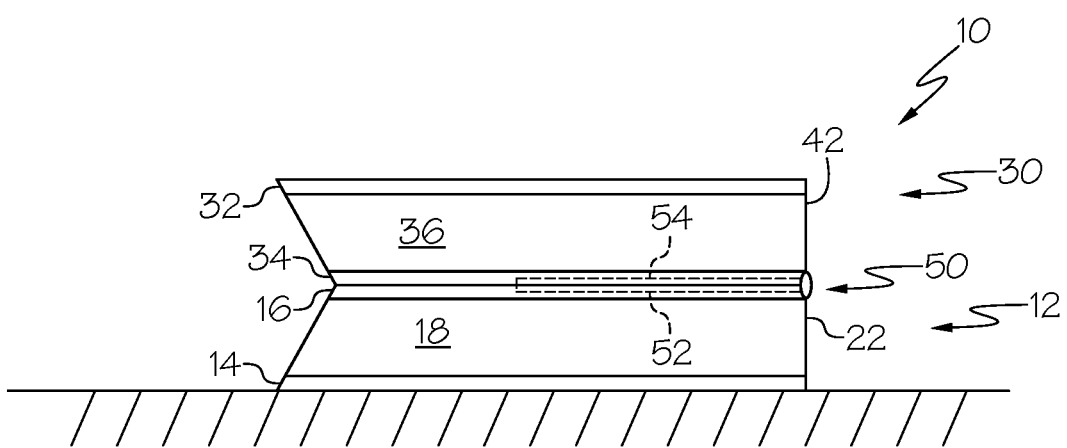
FIG. 7 is a side view of the multi-height deck mat illustrated in FIG. 6.

As seen in FIGS. 6 and 7, the hinge element 50 extends across the width of the upper surface of the mat 10 at the junction of the first platform 12 and the second platform 30. The hinge element 50 may be formed from a flexible material, which may be elastic, extending traversely along the first platform 12 and the second platform 30, and attached to each platform 12, 30 with an adhesive. The hinge element 50 includes a first mounting portion 52 extending between the top surface 14 of the first platform 12 and a second mounting portion 54 extending between the top surface 32 of the second platform 30. The mounting portions extend about nine (9) inches onto each platform 12, 30, illustrated at HL1 and HL2 respectively, and are adhered thereto across substantially the entre contact surfaces with each platform. Accordingly, the hinge element 50 is held fast under shear forces that can affect both platforms 12,30 differently. Each rectangular platform 12, 30 may include a beveled edge portion 20, 40 extending at least partially around the perimeter thereof. Alternately, any of the non-abutting sidewalls may be flat.

Figure 8:
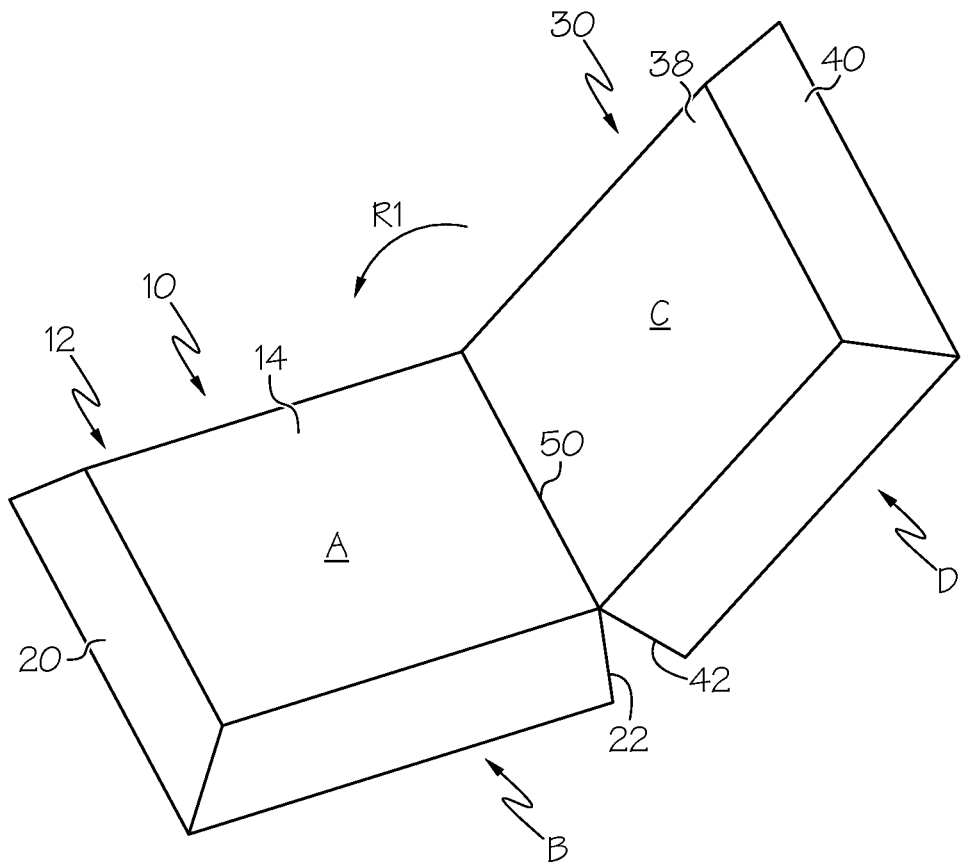
FIG. 8 is a perspective view of the multi-height deck mat illustrated in FIG. 3.
Figure 9:
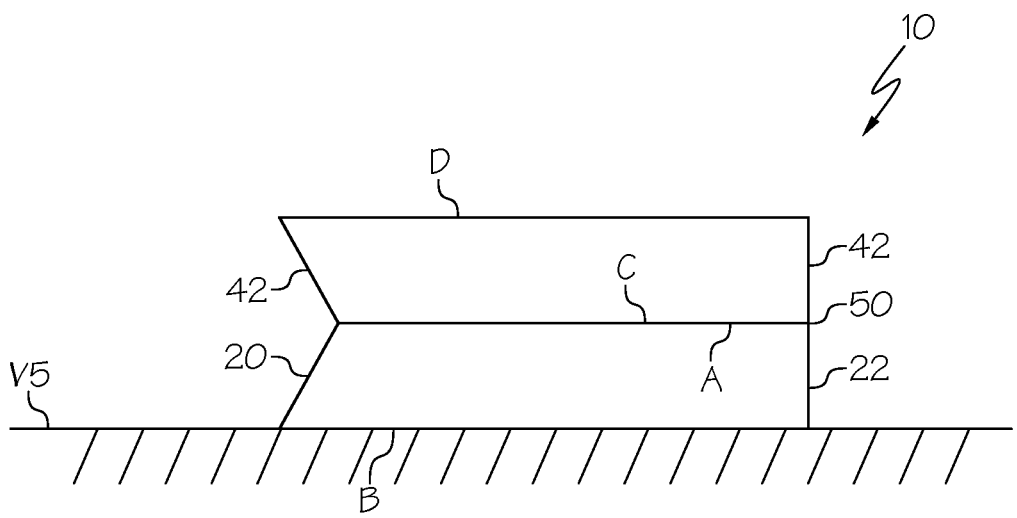
FIG. 9 is a side view of the multi-height deck mat illustrated in FIG. 8.
Figure 10:
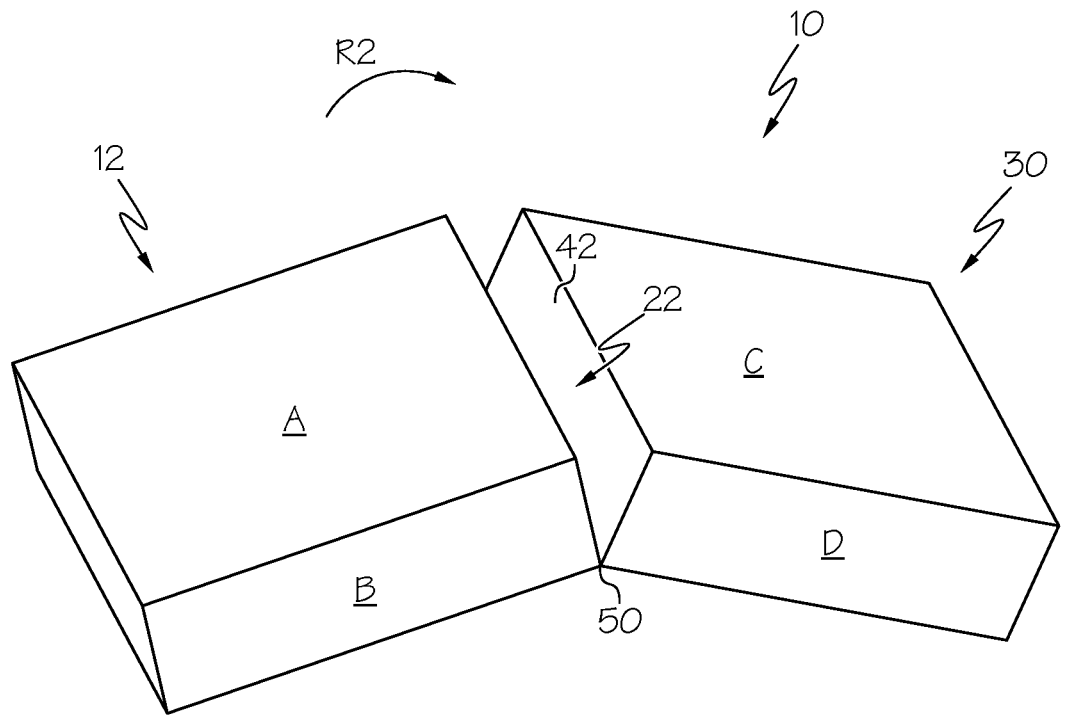
FIG. 10 is a perspective view of a multi-height deck mat according to another preferred embodiment thereof.
Figure 11:
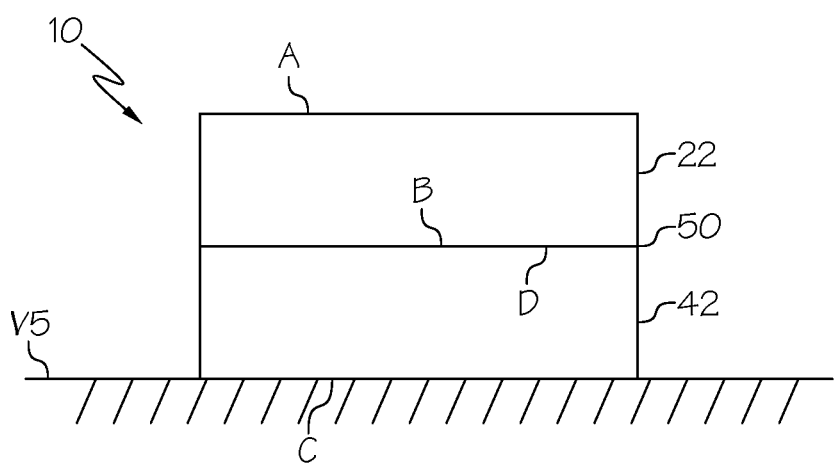
FIG. 11 is a side view of the multi-height deck mat illustrated in FIG. 10.

With references to FIGS. 8 and 9 according to the first embodiment, and in FIGS. 10 and 11 according to the second embodiment, the first platform 12 includes an upper surface A and a bottom surface B. The second platform 30 includes a top surface C and a bottom surface D. Such referencing will help illustrate the different embodiments of the multi-height mat 10 the present invention.

As seen in FIGS. 8 and 9, a first preferred embodiment of the present invention includes the hinge element 50 extending along the junction of top surfaces A and C. Therefore, to operate the mat 10, the second platform 30 is rotated in a counter-clockwise direction, indicated by arrow R1, under the first platform 12, resulting in surfaces A and C being in contact with one another, surface B remaining on the deck V5, and surface D being exposed for use by the boat operator.

Turning now to FIGS. 10 and 11, the second preferred embodiment includes the hinge element 50 extending along the bottom surface and attached to surface B and surface D. Therefore, to operate the mat 10, the second platform 30 is rotated in a clockwise direction, indicated by arrow R2, under the first platform 12, resulting in surfaces B and D being in contact with one another, surface C remaining on the deck V5, and surface A being exposed for use by the boat operator.

In operation, if the boat operator V7 illustrated in FIG. 1 wants to turn over the helm V4 to the second boat operator V8, the mat 10 is changed from the first configuration illustrated in FIG. 1 to the second configuration illustrated in FIG. 2. To do this, as seen in FIG. 4 and FIG. 6, and according to one preferred embodiment of the present invention, the second platform 30 is folded over onto the first platform 12, thereby accommodating the shorter second boat operator V8, resulting in comfortable boat operation therefor. Similarly, using the mat according to the second preferred embodiment, in order to turn over the helm V4 from the first operator V7 to the second operator V8, the second platform 30 is folded under the first platform 12, resulting in the configuration illustrated in FIG. 2 and FIG. 9.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

I claim:

1. A multi-height deck mat for stably supporting a standing boat operator in a marine environment, the multi-height deck mat comprising:
    a first platform having a generally horizontally-oriented first top surface, a generally horizontally-oriented first bottom surface and at least one generally vertically-oriented first end surface extending therebetween;
    a second platform disposed adjacent the first platform and having a generally horizontally-oriented second top surface and a generally horizontally-oriented second bottom surface and at least one generally vertically-oriented second end surface extending therebetween, wherein the surface area of the first and second top surfaces is greater than the surface area of the first and second bottom surfaces, thereby forming a beveled wall intermediate the first and second top surfaces and the first and second bottom surfaces; and
    a hinge element connecting the first platform and the second platform for movement of the first and second platforms relative to one another, the hinge element being disposed adjacent the at least one generally vertically-oriented first end surface and the at least one generally vertically-oriented second end surface,
    whereby the first platform and the second platform are movable between a first disposition wherein the at least one generally vertically-oriented first end surface is in abutment with the at least one generally vertically-oriented second end surface wherein the deck mat provides a first height; and a second disposition wherein the first platform and the second platform assume a stacked relationship wherein the deck mat provides a second height and wherein the first top surface and the second top surface are formed from a polymer defining a textured surface, and wherein the first bottom surface and the second bottom surface are formed from a polymer defining a textured surface for enhanced traction for stably supporting a standing boat operator thereon.

2. A multi-height deck mat according to claim 1 wherein the hinge element connects the first platform and the second platform at the first top surface and the second top surface, whereby the second platform is movable between a first disposition wherein the at least one generally vertically-oriented first end surface is adjacent the at least one generally vertically-oriented second end surface wherein the deck mat provides a first height; and a second disposition wherein the second platform is disposed under the first platform in a stacked relationship with the first top surface in abutment with the second top surface, wherein the deck mat provides a second height.

3. A multi-height deck mat according to claim 1 wherein the hinge element connects the first platform and the second platform at the first bottom surface and the second bottom surface,
    whereby the second platform is movable between a first disposition wherein the at least one generally vertically-oriented first end surface is in abutment with the at least one generally vertically-oriented second end surface wherein the deck mat provides a first height; and a second disposition wherein the first platform is disposed under the second platform in a stacked relationship with the first bottom surface in abutment with the second bottom surface wherein the deck mat provides a second height.

4. A multi-height deck mat according to claim 1 wherein the first platform includes a first layer including the first top surface, a second layer including the first bottom surface and a third layer extending therebetween, wherein the third layer is formed from a cushion material.

5. A multi-height deck mat according to claim 1 wherein the second platform includes a first layer including the second top surface, a second layer including the second bottom surface and a third layer extending therebetween, wherein the third layer is formed from a cushion material.

6. A multi-height deck mat according to claim 5 wherein the first platform includes a first layer including the first top surface, a second layer including the first bottom surface and a third layer extending therebetween, wherein the third layer is formed from a cushion material.

7. A multi-height deck mat according to claim 4 wherein the hinge element is formed as a sheet extending between the first platform and the second platform, with a first sheet portion mounted to the first platform intermediate the first layer and the third layer and a second sheet portion mounted to the second platform intermediate the top layer and the third layer.

8. A multi-height deck mat according to claim 7 wherein a portion of the hinge element extending between the first platform and the second platform is formed from pliant material.

9. A multi-height deck mat for supporting a boat operator in a marine environment, the multi-height deck mat comprising:
    a first platform having a generally horizontally-oriented first top surface, a generally horizontally-oriented first bottom surface and at least one generally vertically-oriented first end surface extending therebetween;
    a second platform disposed adjacent the first platform and having a generally horizontally-oriented second top surface and a generally horizontally-oriented second bottom surface and at least one generally vertically-oriented second end surface extending therebetween; and
    a hinge element connecting the first platform and the second platform for movement of the first and second platforms relative to one another, the hinge element being disposed adjacent the at least one generally vertically-oriented first end surface and the at least one generally vertically-oriented second end surface, the hinge element connecting the first platform and the second platform at the first bottom surface and the second bottom surface,
    wherein the surface area of the first and second top surfaces is greater than the surface area of the first and second bottom surfaces, thereby forming a beveled wall intermediate the first and second top surfaces and the first and second bottom surfaces;

whereby the second platform is movable between a first disposition wherein the at least one generally vertically-oriented first end surface is in abutment with the at least one generally vertically-oriented second end surface wherein the deck mat provides a first height;

and a second disposition wherein the second platform is disposed under the first platform in a stacked relationship with the first bottom surface in abutment with the second bottom surface, wherein the deck mat provides a second height.

10. A multi-height deck mat according to claim 9 wherein the first platform includes a first layer including the first top surface, a second layer including the first bottom surface and a third layer extending therebetween, wherein the third layer is formed from a cushion material.

11. A multi-height deck mat according to claim 9 wherein the second platform includes a first layer including the second top surface, a second layer including the second bottom surface and a third layer extending therebetween, wherein the third layer is formed from a cushion material.

12. A multi-height deck mat according to claim 11 wherein the first platform includes a first layer including the first top surface, a second layer including the first bottom surface and a third layer extending therebetween, wherein the third layer is formed from a cushion material.

13. A multi-height deck mat according to claim 9 wherein the first top surface and the second top surface are formed with a textured polymer for enhanced traction.

14. A multi-height deck mat according to claim 9 wherein the first bottom surface and the second bottom surface are formed with a textured polymer for enhanced traction.

* * * * *